Nov. 10, 1959    H. N. STEPHAN    2,911,887
SLIDE DRIVE RELIEF MECHANISM
Filed Nov. 23, 1953    3 Sheets-Sheet 1
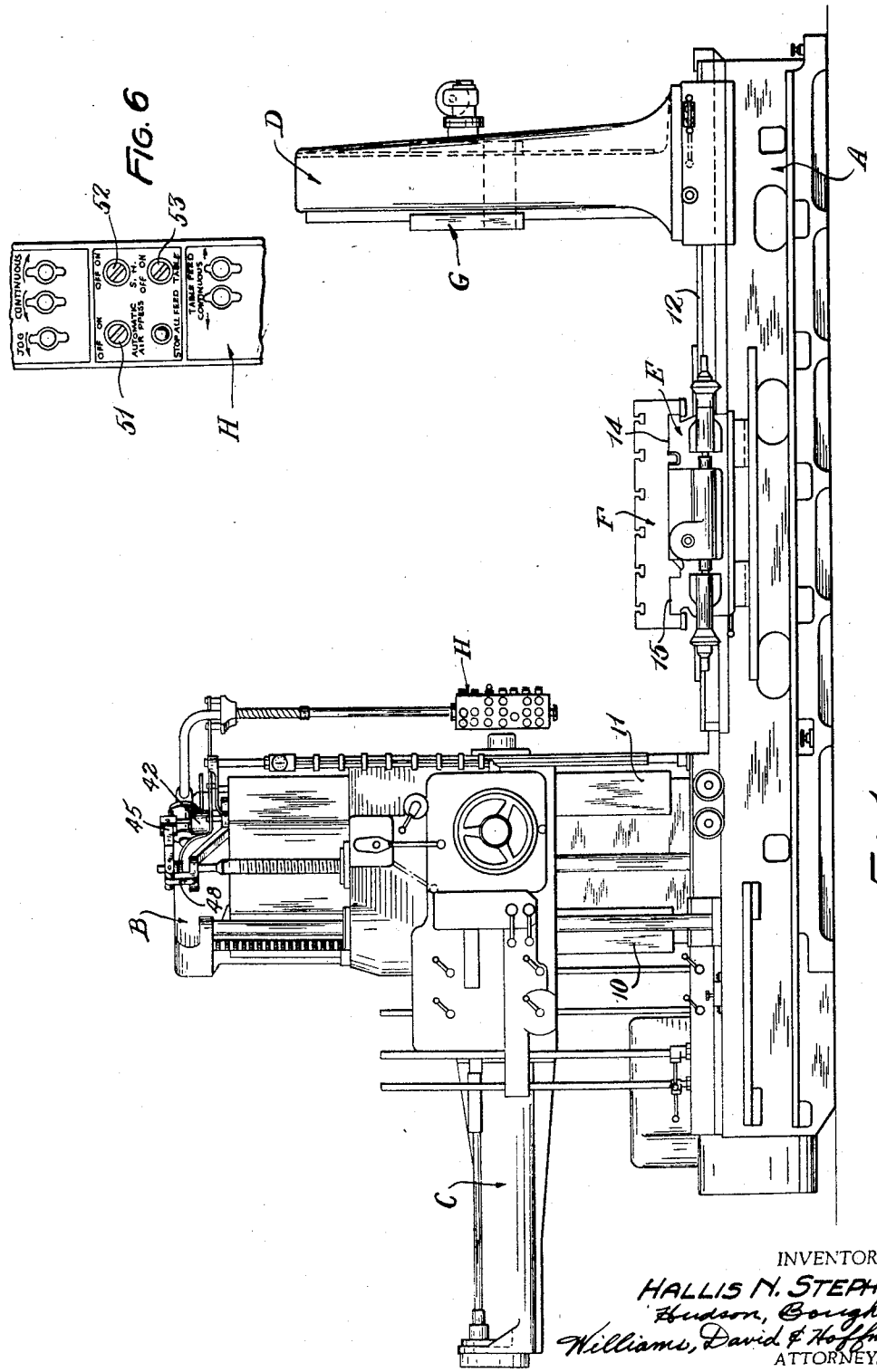
INVENTOR.
HALLIS N. STEPHAN
Hudson, Boughton,
Williams, David & Hoffmann
ATTORNEYS

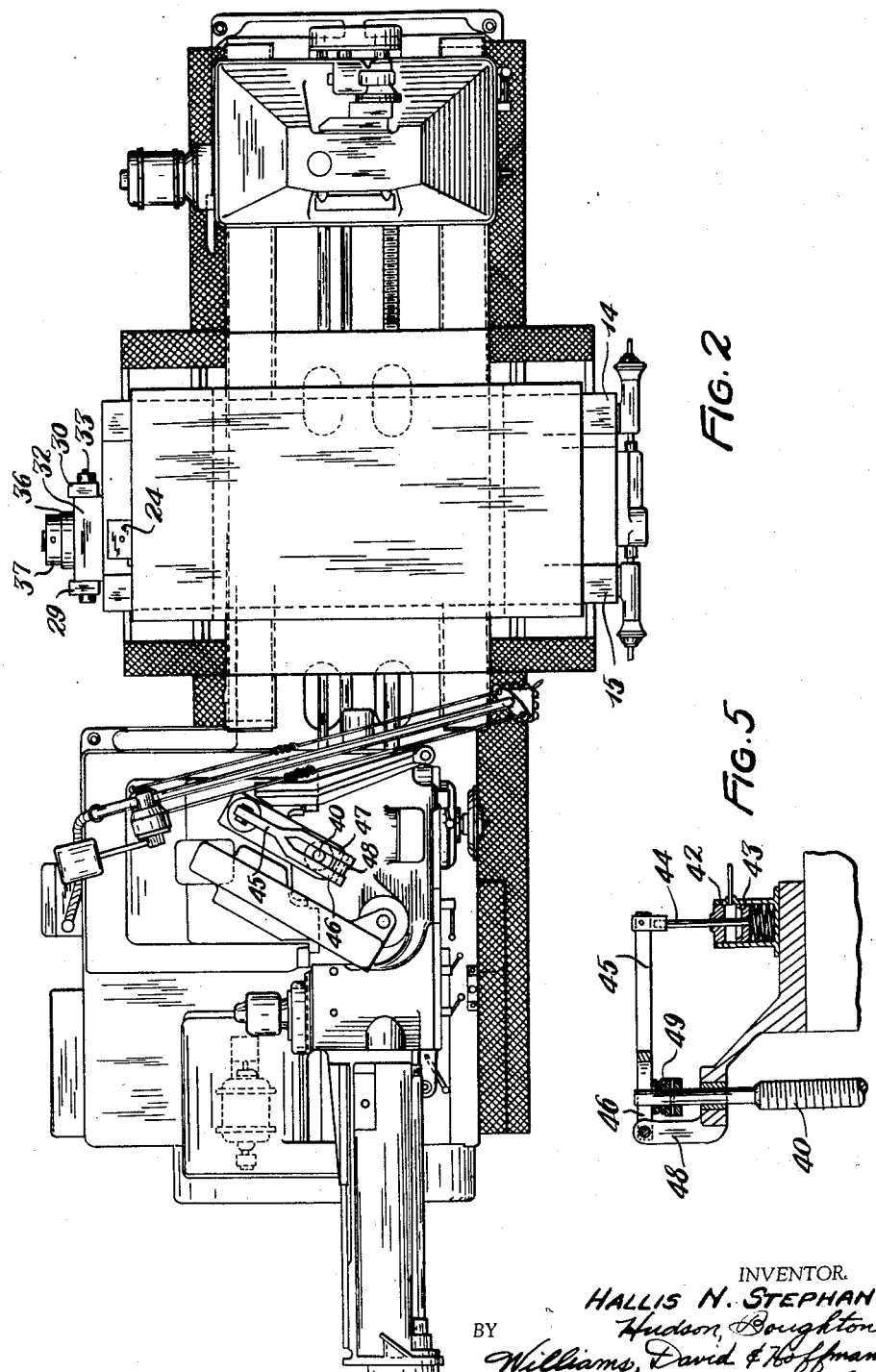

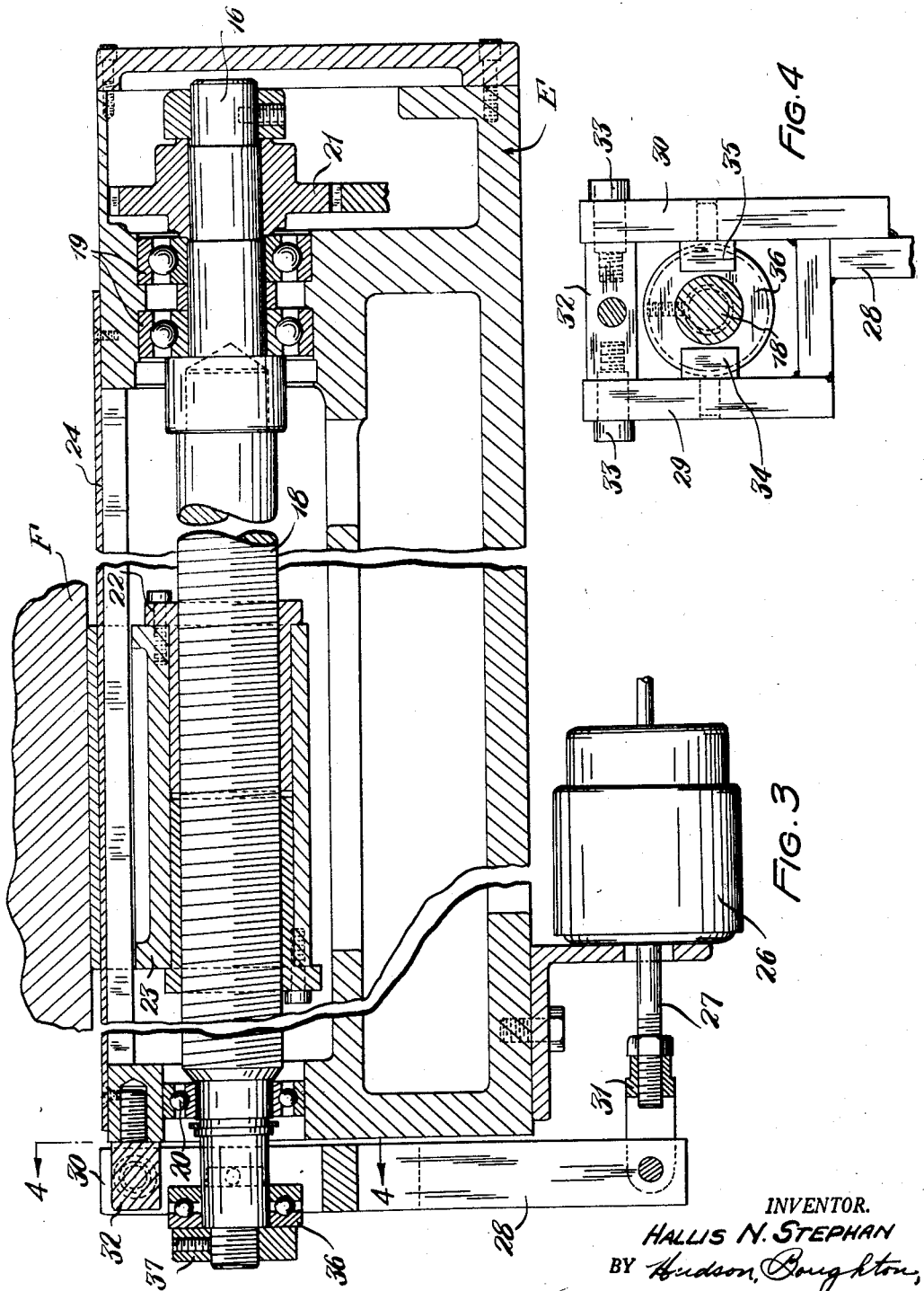

United States Patent Office 2,911,887
Patented Nov. 10, 1959

2,911,887

SLIDE DRIVE RELIEF MECHANISM

Hallis N. Stephan, Cleveland Heights, Ohio, assignor to The New Britain Machine Company, New Britain, Conn., a corporation of Connecticut Application November 23, 1953, Serial No. 393,903

1 Claim. (Cl. 90—21)

The present invention relates to machine tools having a movable machine tool element to be accurately positioned and, more particularly, to a horizontal boring, drilling, and milling machine where the movable machine tool element or elements to be positioned are relatively large and heavy making them difficult to accurately position.

The mechanism for imparting translatory movement to a machine tool element necessarily includes a pair of cooperating members having abutment surfaces adapted to be engaged on movement of one of the members to impart movement to the element. One of the members constitutes a part of the machine tool element and the other member is mounted in operative relationship thereto. Commonly a cooperating nut and lead screw are utilized with one or the other being driven manually or by suitable power means to effect movement of the machine tool element.

Machine tool elements which are to be accurately positioned, especially the relatively large and heavy elements of a horizontal boring, drilling, and milling machine, offer a resistance to movement which creates reactive stresses between the cooperating members that tend to impart movement to the element. The element is ordinarily not relieved of these forces or stresses upon the completion of the positioning operation, and is often subsequently moved from the desired position by the action of these forces especially if the machine or a part thereof is jarred as might occur incident to the setting of clamps, etc. This is undesirable in those machine tools where accurate positioning is important.

One of the principal objects of the invention is the provision of new and improved means for accurately locating a movable machine tool element at a predetermined position comprising a pair of cooperating members having abutment surfaces adapted to be engaged on movement of one of the members to impart movement to the element, one of the members constituting a part of the element, and means for applying a force to one of the members after movement of the element to relieve the machine tool element of stresses created during the movement thereof that tend to cause additional movement subsequent to the positioning of the element.

Another of the principal objects of the invention is the provision of a new and improved machine tool, particularly a horizontal, boring, drilling and milling machine having a machine tool element to be accurately located at a predetermined position and means for positioning the element, preferably power driven, including a cooperating nut and lead screw, the machine being so constructed and arranged that a force is applied to relieve stresses between the nut and lead screw tending to move the element after the element has been located at its predetermined position, thereby preventing forces created during the positioning operation from affecting the position of the member upon termination of operation of the positioning means.

The present invention resides in certain constructions and combinations and arrangements of parts and further objects and advantages thereof will be apparent to those skilled in the art to which the invention relates from the following description of the preferred embodiment thereof described with reference to the accompanying drawings forming a part of this specification and in which, Fig. 1 is a front elevational view of a horizontal boring, drilling and milling machine embodying the present invention;

Fig. 2 is a plan view of the machine of Fig. 1;

Fig. 3 is a fragmentary vertical sectional view through the saddle and table of the machine illustrated in Fig. 1;

Fig. 4 is a view taken approximately along line 4—4 of Fig. 3 and shows a detail of the means for preventing undesired movement of the table after positioning;

Fig. 5 is a fragmentary view partly in section illustrating the application of the present invention to the spindle head lead screw of the machine of Fig. 1; and, Fig. 6 is a fragmentary view of the pendant control station for controlling the operation of the machine of Fig. 1.

The present invention contemplates the provision of a new and improved method and means for relieving a machine tool element which has been accurately positioned of forces created during the positioning of the element and which tend to further advance the element. The invention is particularly adaptable for use where a cooperating nut and lead screw is utilized to move the machine tool element, and while it may be used in various types of machine tools, for purposes of illustration, it has been embodied in a combined horizontal boring, drilling, and milling machine, where it is especially advantageous since the machine tool elements therein are relatively large and heavy making it difficult to accurately position them.

Referring to the drawings, the machine shown is generally of the type disclosed in my prior U.S. Patent 2,339,435 and comprises a base A, provided at one end with a spindle head column B formed with vertical ways 10 and 11 upon which a spindle head C is mounted for vertical movement, and at the other end with a backrest or outboard support column D slidably supported on horizontal ways 12 on the upper side of the bed. The ways 12 also support a saddle E having transversely extending horizontal ways 14 and 15 on the upperside thereof which in turn support a work table F. The backrest column D has vertical ways upon which a backrest block G is mounted for vertical movement. The spindle head, outboard support column D, saddle E, table F and backrest block G are moved by cooperating nuts and lead screws driven by any conventional mechanism the details of which are not necessary for the understanding of the present invention and are, therefore, not shown. A pendant control station H is provided so that the machine operator may conveniently control the movement of the elements of the machine.

The lead screw 18 for moving the table F along the ways 14 and 15 of saddle E is journally supported longitudinally of the saddle between ways 14, 15 by bearings 19, 20 in walls at the opposite ends of the saddle. The front end is secured in the saddle against axial movement by the bearings 19. The forward end of the shaft of lead screw 18 mounts a gear 21 which is driven by suitable drive means located in the bed of the machine and which may be like that described in the above-mentioned patent. The lead screw 18 cooperates with a nut 22 carried by a bracket 23 fixed to the underside of table F. The bracket 23 is constructed so as to permit a lead screw guard 24 mounted on the saddle E above the lead screw to pass therethrough.

When the lead screw 18 is rotated to move the table F torsional forces are created within the lead screw 18 and the bearings and the drive for the screw are stressed or loaded due to the resistance of table F to movement by the lead screw. This stressing or loading tends to cause additional movement of the table after the positioning operation has been completed and the operation of the power means for rotating lead screw has been terminated. This additional movement introduces inaccuracies in the positioning of the table.

According to the present invention suitable mechanism is provided for preventing the movement of the table F by stored forces within the lead screw 18 and its bearings and drive. In the illustrated embodiment this mechanism comprises an air cylinder 26 mounted on the underside of saddle E and adapted to apply an axial stretching force to rear end of the lead screw 18 since the screw is fixed against axial movement its front end and the table is positioned by being moved towards the front of the machine. The air cylinder 26 is so constructed that when the air pressure is applied to the cylinder a piston rod 27 connected to the piston of the cylinder is moved in a direction toward the rearward end of saddle E. The outward movement of the piston rod 27 causes a yoke 28 having arms 29, 30 to move outwardly with respect to the saddle E. The yoke 28 is pivotally connected at its end opposite arms 29, 30 to the piston rod 27 by a connection 31 which permits adjustment of the mechanism. The arms 29, 30 of the yoke 28 straddle a block 32 mounted on the rear side of the saddle E above the screw 18 and are pivotally connected thereto by pins 33 which pass through the arms 29, 30 and thread into the block. The adjacent sides of the arms 29, 30 have mounted thereon opposed blocks 34, 35 which bear against a thrust bearing 36 mounted on the rearward end of shaft 16 of the lead screw 18 which projects outwardly from the saddle E between the arms 29, 30. The thrust bearing 36 is held in a position on the shaft of the lead screw 18 rearward of the arms 29, 30 by a stop nut 37.

The outward movement of the yoke 28 about the pivot pins 33 and against the bearing 36 causes the yoke to apply an axial stretching force to the lead screw 18. The force exerted by the air cylinder is of sufficient magnitude to overcome any tendency of forces stored in the lead screw 18 in the bearing 19 and the drive for the screw due to loading caused by the positioning of the table to cause advancement of the table after the positioning operation has been completed. The direction of the force applied to the lead screw by the motor 26 is such that the force will tend to cause disengagement of the surfaces of the threads of the nut and lead screw which were in abutting relation during the positioning of the table and which cooperated to impart movement thereto. Preferably the air pressure applied to the cylinder 26 is such that the lead screw 18 will be elongated or shifted towards the rear sufficient to cause a spacing to appear between the cooperating abutting surfaces of the nut and lead screw within the limits of the backlash therebetween.

The force applied by the air cylinder 26 to the lead screw 18 must be in a direction opposite to the movement of the table to the desired position. Therefore, in the illustrated embodiment, the table is designed to be moved forwardly to the desired position. The pressure is applied to the air cylinder 26 immediately upon termination of the operation of the power means for rotating lead screw 18 which is stopped when the table is in the desired position.

The spindle head C is adapted to be moved vertically by a lead screw 40 journally supported in the spindle head column B. The spindle head C is positioned in an upward direction and therefore the lower bearing is fixed and suitable mechanism is provided for applying a downward compressive force to the lead screw 40 after the spindle head has been positioned by the power means for rotating the lead screw. The mechanism for applying the axial force to lead screw 40 is similar in construction to the mechanism for elongating lead screw 18 and comprises an air cylinder 42 having a piston 43 adapted to be moved in a downward direction by the introduction of air into the cylinder 42. A piston rod 44 is connected to the piston 43 and extends upwardly from the cylinder 42. The outer end of the piston rod 44 is pivotally connected to one end of a yoke 45 having arms 46, 47 at the opposite end thereof. The arms 46, 47 straddle a post 48 extending upwardly from the spindle head, column B, and are pivotally connected thereto. The underside of the arms 46, 47 engage a thrust bearing 49 mounted on the end of the shaft of lead screw 40.

When the spindle head is moved upwardly to the predetermined position the power means for rotating the lead screw 40 is terminated and air pressure immediately introduced into the air cylinder 42 to pull the yoke 45 downwardly and apply a compressive force to the lead screw for relieving stresses tending to move the spindle head. The drive means per se for rotating the lead screw 40 forms no part of the present invention and is therefore not shown. Drive means similar to that shown and described in detail in the aforesaid patent may be used if so desired.

Preferably the air pressure for applying a force to the lead screw is automatically applied immediately upon the termination of the operation of the power means for moving the element. This may be accomplished by utilizing commercially available solenoid valves preferably one for each element to be controlled. In the illustrated embodiment a spindle head solenoid valve and a table solenoid valve may be provided for controlling the air pressure to the cylinders for applying a force to the respective lead screws. The electrical control circuits for the solenoid valves may include normally open switches which are closed immediately upon termination of the operation of the power means for moving the spindle head or the table, as the case may be, to energize the proper solenoid and supply air to the corresponding air cylinder. The valves are preferably of the type which release the air pressure in the cylinder when the solenoids are deenergized.

In the machine shown the switches and circuit for controlling the movement of the spindle head and table as well as the complete operation of the machine may be the same as that shown and described in detail in my aforesaid patent wherein a feed and rapid traverse motor is selectively operatively connected to each movable machine tool element by an individual clutch for each element. The spindle head and table in the aforesaid patent are stopped at the desired position by the actuation of a table automatic index forward limit switch and a spindle head automatic up limit switch, respectively, designated in the drawings of the aforesaid patent by reference numerals 105, 105', respectively. Switch means for energizing the valve operating solenoids in the event the machine is constructed as in my aforesaid patent may be obtained by providing the table and spindle head automatic limit switches respectively with an additional set of normally open contacts which close upon the operation of the respective switches to stop the spindle head or table, as the case may be, at the desired position. The closing of the additional contacts upon actuation of the automatic limit switches energizes the particular solenoid coil associated with the element and the automatic switch to cause air pressure to be supplied to the corresponding air cylinder to apply an axial force to the lead screw for moving the element. Preferably the control circuit for the solenoids is provided with a selector switch which must be moved to "automatic" before the solenoids will be energized by the operation of the limit switches for stopping the machine tool elements. A single selector switch 51 may be utilized for the table and spindle head. Manually operated off and on switches 52, 53, as shown in Fig. 6, may also be provided so that the respective solenoids may be energized independently of the operation of the limit switches and the circuits of the solenoids for operating the valves may be interlocked with the clutches controlling the movement of the elements so that energization of the solenoids for operating the clutch to move the element causes deenergization of the solenoid valve controlling the force exerted on the lead screw for the element.

Mechanism for relieving forces tending to advance a movable machine element after the termination of the operation of the means for moving the element has been applied in the present application to the spindle head and to the table of the machine. It will be understood however by those skilled in the art that similar mechanism or means could also be applied to the means for moving the saddle of the machine.

The description of the present invention has referred to torsional and axial forces acting on a lead screw for moving the various machine tool elements; it is to be understood that these forces may be present in various parts of the means for moving the element and that the present invention will prevent their acting to disturb the final positioning of the element. The lead screw has also been shown as carried by the fixed member of the machine and the cooperating nut as carried by the movable member. It will be well understood by those skilled in the art that the lead screw and the cooperating nut may be reversed without departing from the spirit of the present invention.

It can be seen from the foregoing description that the enumerated objects and others have been accomplished and a new and improved machine having means in combination therewith for accurately positioning a movable machine tool element has been provided. The machine is so constructed and arranged that stored forces in the gear train or other mechanism for moving the element does not adversely affect the positioning of the element.

While the preferred embodiment of the invention has been described with considerable detail I do not wish to be limited to the particular construction which may be varied within the scope of this invention and it is my intention to hereby cover all adaptations, modifications and variations which come within the practice of those skilled in the art to which the invention relates and which fall within the scope of the appended claim.

Having thus described my invention, I claim:

In a machine tool, a movable member, a support member for supporting said movable member, means for moving said movable member to a predetermined position with respect to said support member including cooperating lead screw and nut elements having threads adapted to cooperate for moving said movable member upon the rotation of one of said cooperating elements, means for mounting one end of said lead screw element in one of said members against axial movement with respect thereto, means for connecting said nut element to the other of said members, means for selectively rotating one of said cooperating elements for moving said movable member in a direction parallel to said lead screw element and extending toward said one end thereof thereby placing the portion of said lead screw element between said one end and said nut element under stress in one direction, power means operatively connected to the other end of said cooperating lead screw element and the said member to which said first mentioned end of said lead screw element is connected and operating therebetween for applying an axial force to said lead screw element in a direction away from said one end to place the entire operating length of said lead screw element under stress in the same one direction, and means activating said power means, at the moment the aforesaid rotating means stop to position said movable element in a desired precise location, to an extent whereby the stress on the length of said lead screw element created by said power means counteracts and prevents the aforesaid stress on said portion of the lead screw element from moving said movable element from said precise location.

References Cited in the file of this patent

UNITED STATES PATENTS

| | | |
|---|---|---|
| 1,140,357 | Clark | May 25, 1915 |
| 1,272,041 | Herr | July 9, 1918 |
| 2,061,778 | Schicht | Nov. 24, 1936 |
| 2,224,257 | Eisele | Dec. 10, 1940 |
| 2,337,223 | Armitage | Dec. 21, 1943 |
| 2,565,539 | Wildhaber | Aug. 28, 1951 |
| 2,643,441 | Gallimore | June 30, 1953 |
| 2,654,291 | Snader | Oct. 6, 1953 |